United States Patent [19]

Robinson et al.

[11] Patent Number: 5,307,504
[45] Date of Patent: Apr. 26, 1994

[54] SYSTEM AND METHOD FOR PRESERVING INSTRUCTION GRANULARITY WHEN TRANSLATING PROGRAM CODE FROM A COMPUTER HAVING A FIRST ARCHITECTURE TO A COMPUTER HAVING A SECOND REDUCED ARCHITECTURE DURING THE OCCURRENCE OF INTERRUPTS DUE TO ASYNCHRONOUS EVENTS

[75] Inventors: Scott G. Robinson, Tyngsboro; Richard L. Sites, Boylston, both of Mass.

[73] Assignee: Digital Equipment Corporation, Maynard, Mass.

[21] Appl. No.: 666,025

[22] Filed: Mar. 7, 1991

[51] Int. Cl.$^5$ .............................................. G06F 5/00
[52] U.S. Cl. ..................................... 395/800; 395/500; 364/941; 364/DIG. 2
[58] Field of Search ............... 395/800, 725, 700, 375, 395/500, 425

[56] References Cited

U.S. PATENT DOCUMENTS

| | | | |
|---|---|---|---|
| 4,992,934 | 2/1991 | Portanova et al. | 395/500 |
| 5,133,072 | 7/1992 | Buzbee | 395/700 |
| 5,197,138 | 3/1993 | Hobbs et al. | 395/375 |

Primary Examiner—Alyssa H. Bowler
Assistant Examiner—John Harrity
Attorney, Agent, or Firm—Albert P. Cefalo; Barry N. Young

[57] ABSTRACT

A computer program of complex instruction set code (CISC) is translated to produce a program of reduced instruction set code (RISC). Each CISC instruction is translated into a sequence of RISC instructions. The sequence includes in order four groups of instructions. The first group includes instructions that get inputs and place them in temporary storage. The second group includes instructions that operate on the inputs and place results in temporary storage. The third group includes instructions that update memory or register state and are subject to possible exceptions. The fourth group includes instructions that update memory or register state and are free of possible exceptions. When execution of the RISC program is interrupted by an asynchronous event, the RISC instruction being executed at the time of the interrupt is recorded and allowed to complete. The recorded instruction is checked against a bit map to determine whether it is a boundary instruction for the instruction sequence being executed, and if it is, then asynchronous event processing is permitted. If not, then a program counter for the RISC code is aligned with the next backup boundary instruction if any instruction remaining to be executed is subject to a possible exception. If no instruction subject to a possible exception is found, the remaining instructions in the sequence are executed while moving the program counter to the next forward boundary instruction and thereafter permitting asynchronous event processing.

45 Claims, 5 Drawing Sheets

SYSTEM AND METHOD FOR PRESERVING INSTRUCTION GRANULARITY WHEN TRANSLATING PROGRAM CODE FROM A COMPUTER HAVING A FIRST ARCHITECTURE TO A COMPUTER HAVING A SECOND REDUCED ARCHITECTURE DURING THE OCCURRENCE OF INTERRUPTS DUE TO ASYNCHRONOUS EVENTS

CROSS-REFERENCE TO RELATED APPLICATIONS

Reference is made to the following concurrently filed patent application, which is hereby incorporated by reference:

Ser. No. 07/666,071 entitled IMPROVED SYSTEM AND METHOD FOR PRESERVING INSTRUCTION STATE-ATOMICITY FOR TRANSLATED PROGRAM CODE and filed by Scott G. Robinson, Richard Sites and Richard Witek.

Reference is also made to the following concurrently filed patent applications assigned to the present assignee and related to code translation:

Ser. No. 07/666,070 entitled BRANCH RESOLUTION VIA BACKWARD SYMBOLIC EXECUTION and filed by Richard L. Sites.

Ser. No. 07/666,216 entitled LOCATING PROGRAM CODE BY SUCCESSIVE CODE EXECUTION AND INTERPRETATION and filed by Richard L. Sites.

Ser. No. 07/666,210 entitled USE OF STACK DEPTH TO IDENTIFY MACHINE CODE MISTAKES and filed by Richard L. Sites.

Ser. No. 07/666,223 entitled CROSS-IMAGE REFERENCING OF PROGRAM CODE and filed by Richard L. Sites.

Ser. No. 07/666,083 entitled USE OF STACK DEPTH TO IDENTIFY ARCHITECTURE AND CALLING STANDARD DEPENDENCIES IN MACHINE CODE and filed by Thomas R. Benson.

Ser. No. 07/666,084 entitled REGISTER USAGE TRACKING TO SUPPORT COMPILED 32-BIT CODE IN 64-BIT ENVIRONMENT and filed by Thomas R. Benson.

Ser. No. 07/666,085 entitled MAPPING ASSEMBLY LANGUAGE ARGUMENT LIST REFERENCES ACROSS MACHINE ARCHITECTURES and filed by Thomas R. Benson.

Ser. No. 07/666,082 entitled TRACKING VAX® CONDITION CODES FOR PORTING TO RISC ARCHITECTURE and filed by Thomas R. Benson.

Ser. No. 07/666,023 entitled EFFICIENT AND FLEXIBLE LINK OF PROGRAM UNITS AT PROGRAM ACTIVATION and filed by Daniel L. Murphy.

Reference is also made to the following concurrently filed patent applications assigned to the present assignee.

Ser. No. 07/666,039 entitled IMPROVED SYSTEM AND METHOD FOR EXECUTING MULTIPLE CODES IN A MULTI-ARCHITECTURE ENVIRONMENT WITH CODE DEBUGGING CAPABILITY and filed by Mark A. Herdeg, James A. Wooldridge, Scott G. Robinson, Ronald F. Brender and Michael V. Iles.

Ser. No. 07/666,028 entitled SYSTEM AND METHOD FOR AUTOMATICALLY INTERFACING CALL CONVENTIONS BETWEEN TWO DISSIMILAR PROGRAM UNITS and filed by Daniel L. Murphy.

Ser. No. 07/665,888 entitled IMPROVED SOFTWARE DEBUGGING SYSTEM AND METHOD ESPECIALLY ADAPTED FOR CODE DEBUGGING WITHIN A MULTI-ARCHITECTURE ENVIRONMENT and filed by James A. Wooldridge, Ronald F. Brender and Henry N. Grieb, III.

Ser. No. 07/666,022 entitled IMPROVED SIMULATOR SYSTEM AND METHOD ESPECIALLY ADAPTED FOR CODE EXECUTION IN A MULTI-CODE EXECUTION AND DEBUGGING SYSTEM WITHIN A MULTI-ARCHITECTURE ENVIRONMENT and filed by Mark A. Herdeg and Michael V. Iles.

Ser. No. 07/666,072 entitled IMPROVED SYSTEM AND METHOD FOR DETECTING CROSS-DOMAIN INSTRUCTION CALLS AND DATA REFERENCES ESPECIALLY ADAPTED FOR CODE INTERFACE JACKETING IN A MULTI-CODE EXECUTION AND DEBUGGING SYSTEM WITHIN A MULTI-ARCHITECTURE ENVIRONMENT and filed by Mark A. Herdeg, Scott G. Robinson, Ronald F. Brender and Michael V. Iles.

Ser. No. 07/665,752 entitled IMPROVED SYSTEM AND METHOD FOR JACKETING CROSS-DOMAIN CALLS IN A MULTI-CODE EXECUTION AND DEBUGGING SYSTEM WITHIN A MULTI-ARCHITECTURE ENVIRONMENT and filed by Ronald F. Brender and Michael V. Iles.

Ser. No. 07/665,886 which is entitled FASTER PROCESS FOR DEVELOPING NEW COMPUTER SYSTEMS EMPLOYING NEW AND BETTER PROCEDURES FOR SOFTWARE DEVELOPMENT AND TESTING and filed by Robert V. Landau, James E. Johnson and Michael V. Iles.

BACKGROUND OF THE INVENTION

The present invention relates to systems and methods for adapting program codes for execution on different computer systems and more particularly to systems and methods for translating codes based on a first instruction set to codes based on a relatively reduced instruction set while preserving instruction granularity.

In the early years of computer programming, instructions for computer programs were generated at the microcode level. With the development and growth of software engineering, more tasks were combined in single complex instructions executable by computers having a hardware architecture designed for the instruction complexity.

Increasing instruction complexity generally provided increasing price/performance benefits in the developing environment of computer hardware costs and performance capabilities. As a result, complex instruction set codes (CISC) became widely accepted.

With increased instruction complexity, however, it has become more difficult to design system hardware for higher execution speed. Instead, a reduced instruction set code (RISC), coupled with correlated RISC computer hardware architecture, has gained acceptance as a mechanism to lead to significantly improved system price/performance.

A RISC system generally employs simpler basic instructions to direct desired operations. A single RISC instruction normally specifies a single operation with at most a single memory access. Further, a RISC system normally provides a register for each basic instruction. The instructions in a RISC instruction set are thus still at a higher level than microcode.

In the typical CISC system, a single instruction may specify a complex sequence of operations and it may make many direct accesses to memory. Thus, operations performed by a CISC instruction may require several RISC instructions.

A RISC system is generally designed with optimized hardware and software tradeoffs that provide faster system operation, better overall system performance and lower system cost relative to available hardware cost and performance capability.

One obstacle to conversion from CISC systems to RISC systems is the existence of large software libraries which have been developed for CISC systems and which are not generally available for RISC systems. When a computer system user chooses to acquire a new computer system, one of the user's major considerations is whether the user's library of application programs can be used or converted for use on the new computer system, and what the cost of replacing that library would be. Thus, for computer system users who wish to achieve better price/performance through RISC computer systems, it is highly important that an economic and effective mechanism be provided for adapting, or "migrating" the user's library of application programs for execution on the RISC computer system.

Several choices are available to the user for program migration. Recompiling or recoding can be employed, but these techniques are typically used for migrating programs written in a high level language such as FORTRAN which either have no detailed machine dependencies or which have any existing machine dependencies removed by manual programming modifications. Further, in recompiling or recoding, the user typically bears all responsibility for program modification and program behavioral guarantees.

Alternatively, interpretation procedures can be used, but the penalty for this approach typically is substantially reduced program performance. More particularly, interpretation procedures are software programs that run on one computer and read a stream of subject instructions (which may well be instructions for a different type of computer) as data, and for each subject instruction perform the indicated operation. Such procedures typically execute 10 to 100 machine instructions on the one computer to interpret a single subject instruction. Thus, interpretation procedures provide substantially reduced program performance, compared to direct execution of functionally-equivalent code on the one computer.

The most effective and efficient migration, however, involves code translation. In code translation, each instruction from an existing program is translated into one or more instructions in the language of the destination machine. Accordingly, a translation of CISC programs to RISC programs, or more generally a program translation in which the translated code has a relatively reduced instruction set, requires "multiple" or "many" instructions in the translated code for each instruction in the code being translated. However, in making "one to many" or CISC-to-RISC code translations, it is generally difficult to preserve many of the instructions behavior guarantees originally provided with the CISC or other relatively complex code.

One normal CISC guarantee that presents some difficulty in translation is the requirement that no other CISC instruction or portion thereof can be executed between the beginning and ending of a single CISC instruction. Accordingly, in translating CISC to RISC it is essential that instruction wholeness or granularity be preserved. Preservation of instruction granularity requires that state or memory atomicity be preserved. Thus, either all memory accesses in an instruction must appear to happen or none must appear to happen in the translated code.

To preserve instruction granularity in the translation process, assurance must be provided that each set, or "grounds", of translated instructions corresponding to each more complex instruction will execute to produce the same result that the corresponding more complex instruction would have produced. This must be true even though asynchronous events may occur during execution of any of the "granules" of simpler translated instructions.

Accordingly, the present invention is directed to a mechanism and process for producing and executing translated codes from existing codes with preservation of instruction granularity thereby enabling computer system price/performance upgrades to be realized while preserving application code investments.

SUMMARY OF THE INVENTION

A system or method is provided for translating a first program code to a second program code and for executing the second program code while preserving instruction granularity of the first code. The first code is executable on a computer having a first architecture adapted to a first instruction set and the second program code is executable on a computer having a second architecture adapted to a second instruction set that is reduced relative to the first instruction set.

A preselected computer is operated to translate the first code instructions to corresponding second code instructions in accordance with a pattern code that defines first code instructions in terms of second code instructions. In the translation, the second code instructions for each first code instruction are organized into an instruction sequence having in order at least two groups of instructions. The first group includes those instructions that do instruction work other than state update and which can be aborted during execution without risking a state error. The second group includes all memory and register state update instructions.

A second computer system having a memory and register state and adapted to the second architecture is operated to execute the second program code. If an asynchronous event interrupts any second code sequence corresponding to a first code instruction before all of the first group instructions have been executed and before the execution of any second group instruction that is subject to a possible state exception, the sequence is aborted and restarted. If the asynchronous event interrupts the sequence execution after execution of any second group instruction, processing of the asynchronous event is delayed and execution of the second code sequence is completed.

BRIEF DESCRIPTION OF THE DRAWINGS

The accompanying drawings, which are incorporated in and constitute a part of this specification, illustrate one embodiment of the invention and together with the description provide an explanation of the objects, advantages and principles of the invention. In the drawings.

DESCRIPTION OF THE PREFERRED EMBODIMENT

Figure 1:
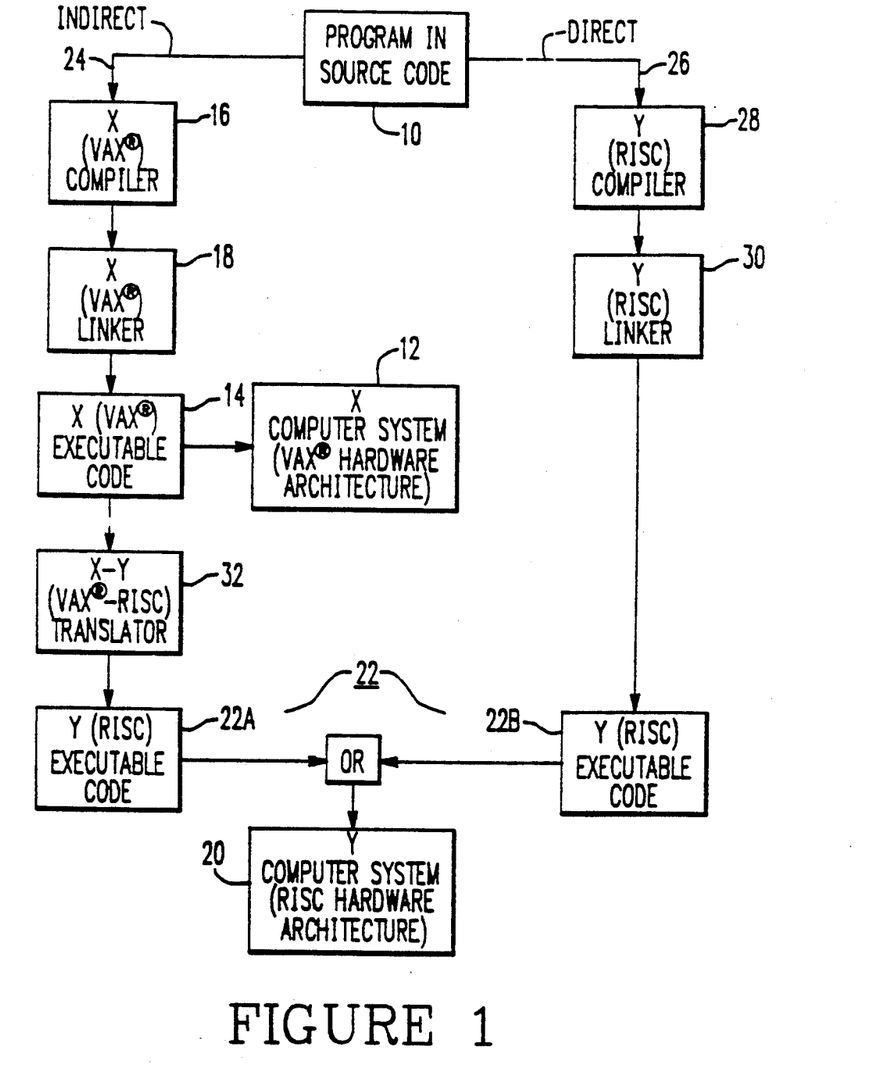
FIG. 1 shows an overall functional block diagram indicating the general manner in which application programs are (a.) created for execution by a first computer system (having a first instruction set and designated as X) and (b.) translated with X instruction granularity in accordance with the present invention for execution by a different computer system (designated as Y) having a relatively reduced instruction set.

As shown in FIG. 1, an application program 10, written in source code, is one of a number of application programs held in a user's program library for execution in an X computer system 12. The hardware architecture for the X computer system 12 is adapted for operation with an X instruction set employed in producing an executable form of the program 10 or other application programs in the user's library.

To adapt the program 10 for use with a Y computer system 20, it is necessary that the executable form of the program 10 be provided as a Y executable code 22 employing a Y instruction set to which the hardware architecture of the Y computer system 20 is adapted.

The Y instruction set generally employs fewer basic instructions than the X instruction set employs, and conversion of X code to Y code requires a "one to many" instructions translation. The X instruction set can be a CISC instruction set and the Y instruction set can be a RISC instruction set. For example, as specifically indicated for illustrative purposes in FIG. 1, the X system can employ the VAX ® architecture and the Y system can employ a reduced instruction set architecture called the RISC architecture within the Digital Equipment Corporation. Both architectures are embodied in equipment made by Digital Equipment Corporation, assignee of the present application.

As shown in FIG. 1, the application program 10 can be migrated to the Y executable code 22 in either an indirect path 24 or a direct path 26. Direct migration is obtained with the use of a Y compiler 28 and a Y linker 30. The resultant Y executable code is designated by the reference numeral 22B.

If a Y compiler 28 and Y linker 30 have never been developed or otherwise are unavailable or the user elects not to use the direct migration path 26 because of associated disadvantages, the indirect path 24 in accordance with the present invention may be used to migrate the X application program to the Y system to achieve both a program investment savings and a system performance gain.

In the indirect path, the program 10 is converted to executable code 14 for the X computer system 12 by means of an X compiler 16 and an X linker 18. The result is X executable code 14 which can run on the X computer system 12.

An X-Y translator 32 is provided in the preferred embodiment to translate the X executable code 14 into the corresponding Y executable application code designated by the reference numeral 22A. The code translation is achieved so that the Y code executes to achieve the X code results accurately with instruction granularity even though the Y code is based on a reduced instruction set.

TRANSLATION OF X APPLICATION CODE TO Y APPLICATION CODE

Preferably, a code translation system 40 (FIG. 2) is employed to implement the translator 32 referenced in FIG. 1. The translation system 40 includes a conventional general purpose computer having a processor 42, a memory system 44, and various input/output devices (not shown) through which X application code 43 is input for translation.

Figure 2:
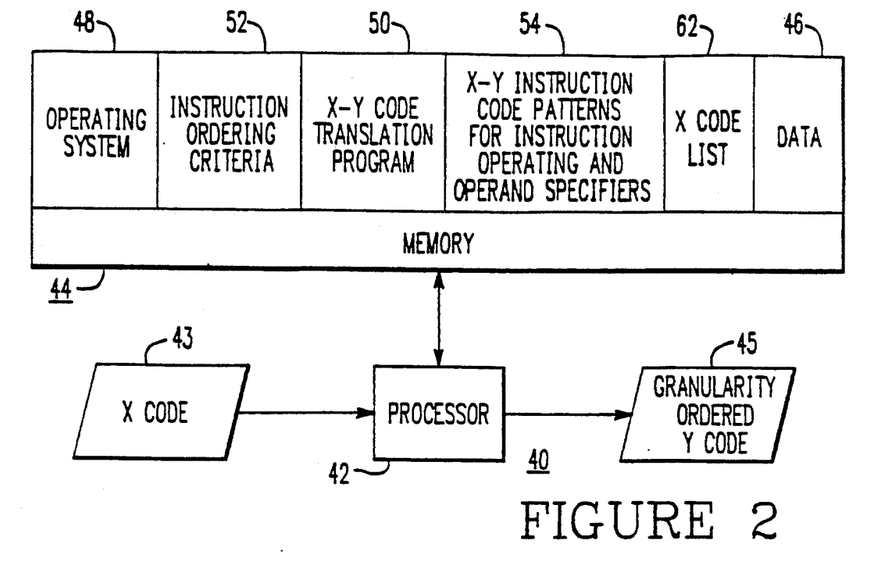
FIG. 2 shows a generalized functional block diagram of the preferred X-Y translation program and a general purpose computer system in which the X-Y translation program is executed to generate, with X instruction granularity, a Y executable application code from an input X application code.

The translation results are generated in accordance with the present invention as Y code 45 which is ordered to preserve hard guarantees of the code being translated and particularly to facilitate a guaranteed preservation of X instruction granularity when the Y code is actually executed. Hard CISC guarantees are exemplified by hard VAX ® guarantees which are described more fully in the referenced application 1870-409.

The memory system 44 includes, among other sections, a conventional data storage section 46 and a section 48 in which the computer operating system is stored. A basic element employed in X-Y code translation is a translation program 50 stored in another memory section. The input X code 43 is stored as an X code list 62. Further, to control the sequencing of Y instructions, Y instruction ordering criteria 52 are stored and X-Y instruction code patterns 54 are stored to enable translation of both instruction operation specifiers and instruction operand specifiers.

Figure 3:
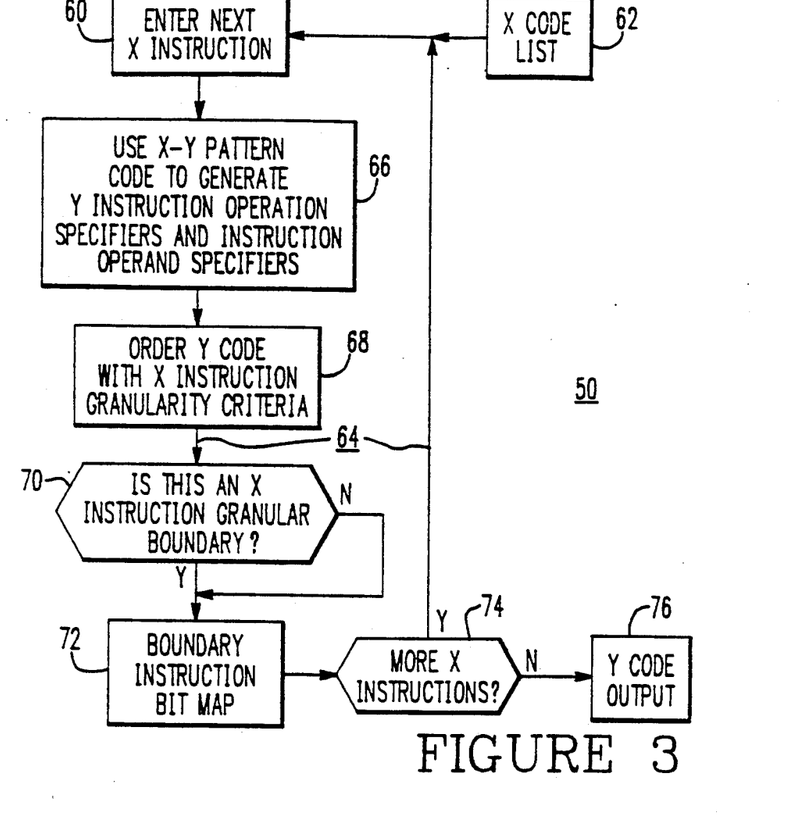
FIG. 3 shows a general flow chart for the X-Y translation program in accordance with the present invention.

A general flow chart for the translation program 50 is shown in its preferred form in FIG. 3. Successive X instructions are entered sequentially by block 60 from the stored X code list 62 for processing through a program loop 64.

In the loop 64, functional block 66 generates Y instruction operation and operand specifiers corresponding to the currently processed X instruction and in accordance with the stored X-Y code patterns 54 (FIG. 2). Next, as indicated by functional block 68, the resultant Y code is ordered in accordance with predetermined criteria that facilitate preservation of X instruction granularity during subsequent actual Y code execution.

Figure 6:
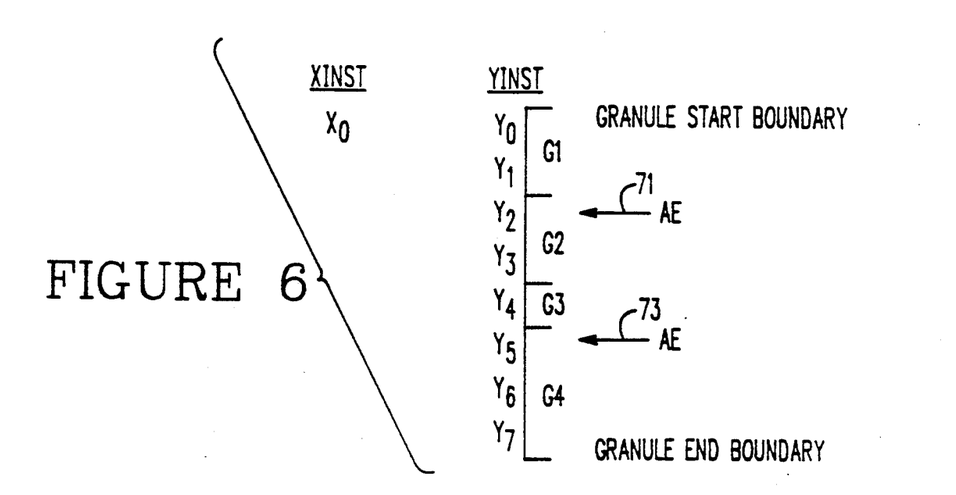
FIG. 6 shows a diagram that symbolizes an X-Y code instruction translation and the relationship of asynchronous events thereto.

A graphic representation of an X-Y instruction translation is shown in FIG. 6.

Every X instruction generally provides for the elemental tasks of getting inputs, modifying inputs, placing the results in temporary storage, and providing a state update for memory and register locations. When an X instruction is translated to "many" Y instructions, the ordering criteria 52 (FIG. 2) employed to organize the Y instructions preferably are those that group and order the Y instructions in the Y code for the currently translated X instruction (granule) as follows:

1. A first group G1 of instructions in the Y code are those that get inputs and place those inputs in temporary storage.
2. A second group G2 of instructions in the Y code are those that operate on inputs, generate modified results, and store those results to temporary storage.
3. A third group G3 of instructions in the Y code are those that update X state (memory or register) and are subject to possible exceptions (as defined hereinafter).
4. A fourth and last group G4 of instructions in the Y code are those that update X state (memory or register) and are free of possible exceptions.

X state includes X memory state and X register state. X memory state, represented by the reference character 95 in FIG. 4, and X register state represented by the reference character 97 refer respectively to memory and register structure in the Y machine dedicated to be X code defined storage locations. X memory and register states can also be said to be memory state and register state that are visible to the X architecture.

As a result of implementing the preferred Y instruction organization criteria in the X-Y code translation, preservation of X instruction granularity is facilitated for the following reasons:

1. If an asynchronous event occurs during Y code execution at any time during the execution of the first two groups G1 and G2 of Y instructions as shown by an arrow 71 in the diagram of FIG. 6, X instruction granularity is maintained by permitting asynchronous event processing and backing up the Y instruction counter PC to the next backup Y instruction ($Y_O$ in FIG. 6) that is a granular boundary for an X instruction.

By aborting execution of the current Y code sequence for a retry, possible breakage of X instruction granularity is avoided because a possible state access failure is avoided in any group G3 instruction in the current Y code sequence. However, as a result of the Y code organization, only temporary storage locations are erased and X instruction granularity is preserved since execution of the current Y code granule has been delayed until it can be processed with instruction granularity after the asynchronous event processing.

2. If an asynchronous event occurs after Y instructions in the groups G1 and G2 have been executed and if there are no Y instructions in the group G3, or if the event occurs after execution of all Y instructions included in the group G3 as indicated by an arrow 73 in FIG. 6, the processing of the asynchronous event can be briefly delayed as the group G4 instructions are executed with foreknowledge that no state exceptions are possible. Again execution is provided with X instruction granularity.

In the case where multiple Y instructions are included in the group G3 (not shown in FIG. 6) and an asynchronous event occurs after one Y instruction has been executed, but at least one Y instruction in the group G3 remains to be executed, memory atomicity can be provided within the current Y code granule for preserving X instruction granularity. Memory atomicity essentially requires that all memory accesses of the X instruction appear to happen or none appear to happen, and is necessary for X instruction granularity.

Memory atomicity and mechanisms for achieving it in such cases as well as other special cases are more fully considered in the concurrently filed and cross referenced patent application (1870-0409). In the preferred embodiment in which simple one-write X instructions are handled, X memory atomicity and X instruction granularity are achieved concurrently.

With reference again to FIG. 3, once the functional block 68 orders the Y instruction code as described, block 70 determines whether the current Y instruction is a boundary or "X granule" marker for the X instruction from which it was derived. The yes and no bits detected for successively processed Y instructions are recorded in an X boundary instruction bit map by functional block 72.

A test block 74 checks whether more X instructions are listed for translation processing. If so, the loop 64 is repeated. When all of the X instructions have been translated, the loop cycling is terminated and the accumulated Y code is made available for output, as indicated by functional block 76.

The following two specific examples of CISC instructions from the VAX ® architecture exemplify the translation function in accordance with the invention:

EXAMPLE 1

INCL (R1)+

This instruction adds 1 to the longword (4-bytes or 32 bits) of memory whose address is contained in R1. R1 is then incremented to point to the next longword.

The following RISC (Y) code was generated from the translator operating with the described organization criteria:

| ldl | r23,(rl) | ; Load the contents of memory at address (R1) to R23 |
| addl | r23,#1,r24 | ; Increment R23 by 1 and put in R24 |
| stl | r24,(rl) | ; Store R24 in memory at address (R1) |
| lda | rl,4(rl) | ; Increment R1 by four to point to next longword |

EXAMPLE 2

MOVL (R1)+, (R2)+

This instruction moves the longword from memory addressed by the contents of R1 to the longword addressed by the contents of R2. Both R1 and R2 are incremented to point to the next longword after the one originally pointed when the instruction began. The following RISC (Y) code was generated from the translator operating with the described organization criteria:

| ldl | r23,(r0) | ; Load the contents of memory |

|     |          |                                                              |
| --- | -------- | ------------------------------------------------------------ |
|     |          | at (R0) to R23                                               |
| stl | r23,(r2) | ; Store the contents of R23 to memory at location (R2)       |
| lda | r1,4(r1) | ; Increment R1 by four to point to next longword             |
| lda | r2,4(r2) | ; Increment R2 by four to point to next longword             |

EXECUTING THE RESULTANT Y CODE WITH GUARANTEED X INSTRUCTION GRANULARITY

A Y processor 80 corresponding to the Y computer system 20 (FIG. 1) is provided for executing the resultant Y code with X instruction granularity guaranteed to be preserved. Conventional data input/output devices 82 and an interval clock 84 are coupled to the Y processor 80, and from time to time these devices generate interrupts constituting asynchronous events that demand a temporary diversion of processor operation from the Y code execution. Without the protection guarantee provided by the present invention, processor diversion caused by these or other interrupts is capable of causing a breakdown of X instruction granularity in the Y code execution. This typically occurs because of possible Y instruction input changes after the interrupt, but before memory state changes have been made by the current Y instruction.

Figure 4:
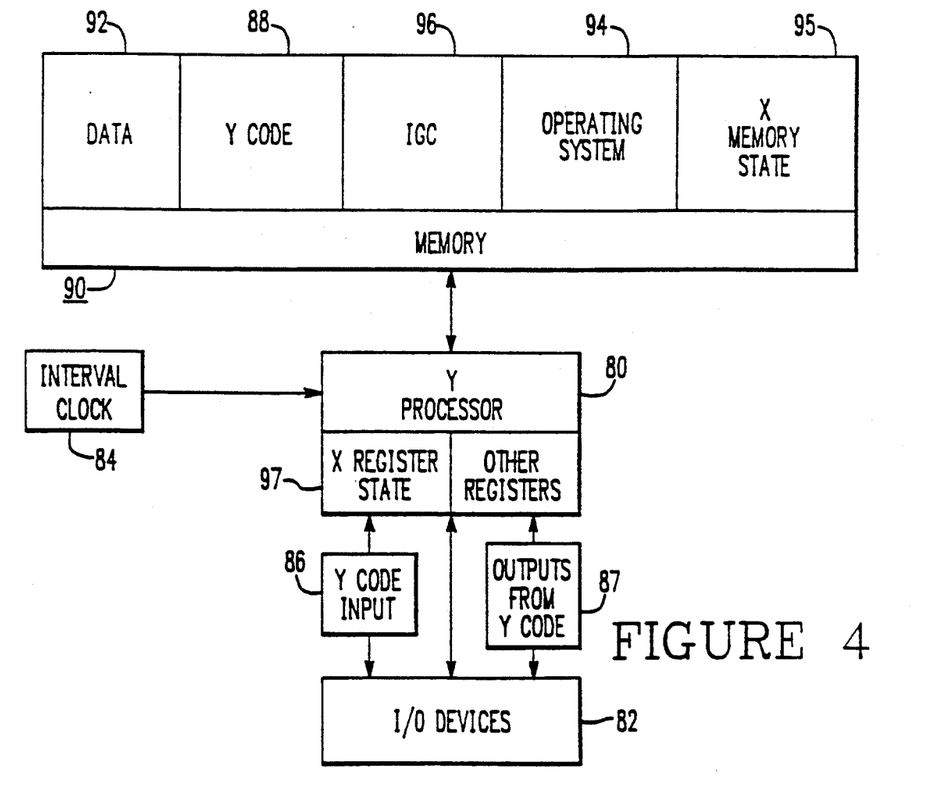
FIG. 4 shows a functional block diagram of the Y computer system with the Y application code obtained from the X code translation and loaded into the Y computer for execution along with an instruction granularity control (IGC) program which supervises execution of the Y code in accordance with the present invention to guarantee preservation of X instruction granularity.

As shown in FIG. 4, a block 86 represents the input of the generated Y code from an input device to a section 88 of a memory system 90 coupled to the Y processor 80, and a block 87 represents data outputs generated for output devices as a result of Y code execution. The memory system 90 also includes a conventional data section 92 and a conventional operating system section 94.

An instruction granularity control program (IGC) 96 is structured in accordance with the invention and stored in another memory section designated by the same reference character. Operation of the IGC program 96 in the execution of the Y code is more fully represented by the flow charts shown in FIGS. 5A and 5B.

The IGC program 96 (FIG. 5A) starts as indicated at 98 with the generation of an asynchronous event. Generally, an asynchronous event is defined as a diversion of the Y instruction stream due to interrupts that could potentially generate X state changes that are visible to the translated X code. Reference is again made to FIG. 6 for a diagrammatic representation of the relationship of asynchronous events to an X granule of Y instructions The following exemplifies interaction of an asynchronous event with the Y instruction stream:

```
Normal Execution: Y0 Y1 Y2 Y3 Y4 Y5
X Instr Boundary---    ---    ---.   -
Async Event Execution: Y0 Y1 Y47 Y48 Y49
Event occurs -------------
```

The IGC program 96 must align the Y Instruction address to Y1 (if Y2 has a possible exception as subsequently defined) or to Y3 (by executing Y2 if Y2 has no possible exceptions) before executing any other changes in the X state.

Figure 5A:
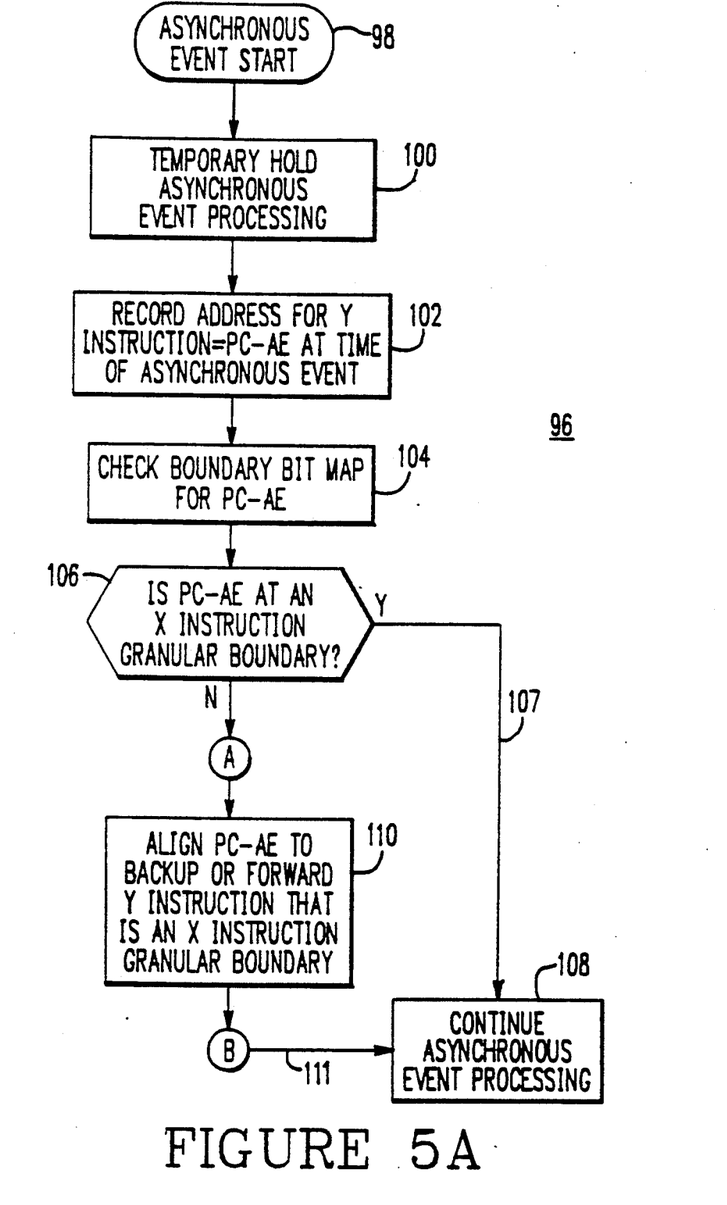
FIGS. 5A and 5B show flow charts representing the preferred functional steps performed by the IGC program.

With reference again to the flow chart in FIG. 5A, a temporary hold is placed on processing the asynchronous event by functional block 100, and the memory address of the Y instruction (designated as PC-AE) being processed at the time of the asynchronous event is recorded by functional block 102.

Next, the previously referenced bit map is checked by block 104 to determine whether the Y instruction PC-AE is an X instruction boundary. If it is, test block 106 directs the IGC program over path 107 to block 108 which allows resumption of processing of the asynchronous event, without breaking X code instruction granularity.

If the Y instruction PC-AE is not an X instruction boundary, functional block 110 aligns the Y instruction counter PC with the next previous or next upcoming forward Y instruction that is an X instruction boundary. A program path 111 is then followed by the IGC program 96 to the block 108 for asynchronous event processing as previously described, again without breaking X code instruction granularity. In this instance, the asynchronous event has occurred at a point in time when not all of the Y instructions have executed within an X instruction granule, and preservation of X instruction granularity is achieved through operation of the program block 110, as more fully detailed in FIG. 5B. The markers "A" and "B" in FIG. 5A indicate where the detail blocks of FIG. 5B fit into the flow chart of FIG. 5A.

Figure 5B:
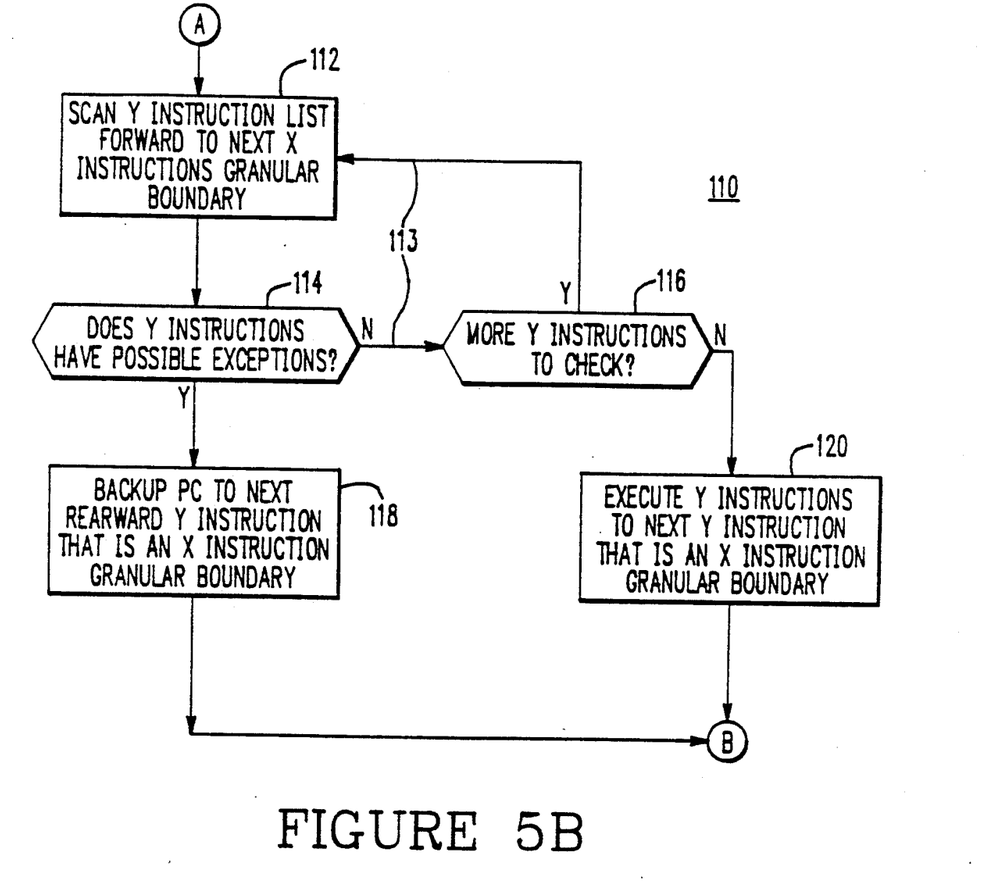

In FIG. 5B, forward scan of the Y instructions is made by functional block 112 in a program loop 113 to find the next Y instruction that is an X instruction boundary. Test block 114 checks each forwardly scanned Y instruction to determine whether processing the interrupt prior to execution of the remaining Y instructions could produce a Y code execution result different from the result that would have been produced had the corresponding X code been executed with imposition of the same asynchronous event.

In making each forward Y instruction test, the test block 114 preferably determines whether an exception, condition may be produced by attempted execution of the Y instruction if the asynchronous event were allowed to be processed and the execution of the Y code sequence then rescinded. Generally, an instruction has an exception if it possibly cannot be completed. The following are the general classes of exceptions that, if identified to a forward Y instruction, generate a Y code abort to the next previous Y instruction that is an X boundary:

1.) Memory management exceptions such as access control violations or page faults.
2.) Arithmetic exceptions such as floating point overflow faults or divide by zero faults.
3.) Instruction exceptions such as illegal operation codes or breakpoint operation codes.

In the preferred embodiment of the invention, a list of the applicable exceptions for the code being translated is placed in storage accessible to the IGC program during execution. Exception determinations are thus made by referencing each forwardly scanned Y instruction against the stored exceptions list.

The following is an example of an exception case:

A shared memory location is incremented by an asynchronous event.

|     |              |                              |
| --- | ------------ | ---------------------------- |
|     | INCL @#33 increments location 33. |                |
|     | The RISC instructions are:   |                              |
| LDL | R23,33(R31)  | ; Load R23 from location 33  |
| LDA | R23,1(R23)   | ; Add 1 to the contents of R23 |

```
        INCL @#33 increments location 33.
              The RISC instructions are:
    STL    R23,33(R31)      ; Store R23 result back at
                              location 33
```

If the asynchronous event occurs between the LDA and STL instructions, and the processing of the asynchronous event increments location 33, the increment done during the event would be lost when the stream resumes at the STL instruction.

The following is an example of a non-exception case:

The instruction INCL R1 increments R1. The RISC instruction is:

```
    LDA    R1,1(R1)         ; Increment R1
```

There is no opportunity for an exception here.

If in testing successive Y instructions in the forward scan, and, if all scanned Y instructions show no exception (block 116), the remaining Y instructions are executed before asynchronous event processing is enabled by block 108 (FIG. 5A) without breaking X instruction granularity as previously described. On the other hand, if a forwardly scanned Y instruction shows an exception under the test by the block 118, functional block 118 backs up the Y program counter to the next backup Y instruction that is an X instruction boundary, and asynchronous event processing is again enabled by the block 108 (FIG. 5A) without breaking X instruction granularity. In this manner, even the possibility of a break in X instruction granularity is avoided and X instruction granularity is thereby guaranteed.

In summary of the case of translating an instruction having no writes to state, or only a single aligned full longword or quadword write, there are no byte- or unaligned-write problems, and no interlocked problems. The only problem is that of making either the entire sequence or none of the sequence appear to execute. The translation is constrained such that in the case of CISC-to-RISC translation, the first and second groups of RISC instructions do all the work of the CISC instruction except for memory and/or register state update, the third group of RISC instructions include zero or one RISC store instruction to a full aligned longword or quadword, and the fourth group of RISC instructions includes only simple register moves.

A translated sequence that is interrupted before the second instruction group completes is forced to restart at the beginning of the sequence by using a bit table that marks the beginning of the code for each translated CISC instruction. A translated sequence that is interrupted after the second instruction group completes but before the third instruction group completes is forced to complete the third instruction group with simple register moves.

The net effect is that the sequence either executes from beginning to end with no other translated sequence in the middle, or it is suspended before the completion of group 2 and retried from the beginning later. This case also applies to a 1- or 2-byte non-interlocked write on a single-processor machine. The translated sequence includes a state read-modify-write sequence, and the single write is the group 3 instruction.

Overall, the present invention provides an effective mechanism for achieving "one to many" application code translations with the generated code being accurate to the original "one" code in terms of execution results and specifically being executable with original code instruction granularity guaranteed. Accordingly, investments in original CISC or similar code can be saved while price/performance benefits can simultaneously be achieved through use of the application code translations on RISC or other advanced price/performance computer systems having relatively reduced instruction sets.

It will be apparent to those skilled in the art that modifications and variations can be made in the method and systems of this invention for achieving instruction granularity in translated code. The invention in its broader aspects is therefore not limited to the specific details, representative methods and apparatus, and illustrative examples shown and described in the specification. Departure may be made from such details without departing from the spirit or scope of the general inventive concept.

Various modifications and variations can be made in the improved system and method for preserving instruction granularity for translated program code of the present invention by those skilled in the pertaining art without departing from the scope and spirit of the invention. It is accordingly intended that the present invention embrace such modifications and variations to the extent they come within the scope of the appended claims and their equivalents.

What is claimed is:

1. A method for translating a first program code to a second program code and for executing the second program code while preserving instruction granularity of the first program code when processing interrupts in response to asynchronous events, the first program code being executable on a computer having a first architecture adapted to a first instruction set and the second program code being executable on a computer having a memory and register state and a second architecture adapted to a second instruction set that is reduced relative to the first instruction set, said method comprising the steps of:

(a) operating a first computer to translate each first code instruction to a corresponding granular sequence of second code instructions wherein said second code instructions include at least two groups of said second code instructions, said two groups including a first group and a second group, said first group including second code instructions other than state update instructions which can be aborted during execution without risking a state error, said second group including all state update instructions, and wherein every second group instruction follows every first group instruction in each granular sequence of second code instructions;

(b) operating a second computer system adapted with the second architecture to execute the second program code; and in response to each asynchronous event during second code execution, interrupting execution of a current granular second code instruction sequence in order to perform asynchronous event processing for said each asynchronous event by (i) aborting for a retry said current second code granular instruction sequence when said execution of said current granular second code instruction sequence is interrupted either before every first group instruction in said current granular second code instruction sequence has been executed, or, after all first group instructions in said current granular second code instruction sequence have been executed but before execution of any second group instruction that is in said current granular second code instruction sequence and is subject to a possible exception; and (ii) delaying said asynchronous event processing for said each asynchronous event, in order to execute any unexecuted second code instructions in said current granular second code instruction sequence, when said execution of said current granular second code instruction sequence is interrupted after execution of all state update instructions that are in said current granular second code instruction sequence, that are in said second group, and that are subject to a possible exception.

2. A method as set forth in claim 1 wherein said second group of second code instruction includes a third subgroup including state update instructions that are subject to exception, and a fourth subgroup including state update instructions that are free of exception, and wherein every fourth subgroup instruction follows every third subgroup instruction in each granular sequence of second code instructions.

3. A method as set forth in claim 2 wherein said first group of second code instructions includes a first subgroup of instructions that read and temporarily store inputs and a second subgroup of instructions that operate on said inputs and generate and temporarily store modified results.

4. A method as set forth in claim 2 wherein said asynchronous event processing is delayed for completion of execution of said current granular second code instruction sequence when said execution of said current granular second code instruction sequence is interrupted after execution of any of said third subgroup instructions that are in said current granular second code instruction sequence.

5. A method as set forth in claim 2 wherein the granular sequence of second code instructions corresponding to one of said first code instructions includes a single simple write instruction that is in said third subgroup.

6. A method as set forth in claim 1 wherein a memory record is made as to whether each second code instruction is a granular boundary instruction for the first code instruction to which it corresponds.

7. A method as set forth in claim 6 wherein when execution of said current granular second code instruction sequence is interrupted, a second code instruction having been last executed is recorded and checked against said memory record to determine whether said second code instruction having been last executed is a boundary instruction, and when said second code instruction having been last executed is a boundary instruction, asynchronous event processing is continued.

8. A method as set forth in claim 7 wherein when said second code instruction having been last executed is not a boundary instruction, a program counter for the second program code is aligned with a next previous boundary instruction in said second program code when said current second code granular instruction sequence is aborted for a retry, and said program counter for the second program code is aligned with a next following boundary instruction in said second program code when said asynchronous event processing for said each asynchronous event is delayed in order to execute any unexecuted second code instructions in said current granular second code instruction sequence.

9. A method as set forth in claim 8 which includes making a forward scan of second code instructions remaining to be executed in said current granular second code instruction sequence to determine whether any of the second code instructions remaining to be executed are subject to a possible exception, backing the program counter for the second program code to the next previous boundary instruction when an instruction subject to exception is found during said forward scan, and when no instruction subject to an exception is found during said forward scan, executing said second code instructions remaining to be executed in said current granular second code instruction sequence, and then continuing asynchronous event processing.

10. A method as set forth in claim 9 wherein said step of operating said first computer to translate each first code instruction to a corresponding granular sequence of second code instructions includes making a list of each second code instruction having a possible exception and wherein said list is checked during said forward scan when determining whether any of the second code instructions remaining to be executed are subject to a possible exception.

11. A method as set forth in claim 1 or 2 or 10 wherein said second code instructions include instructions subject to possible memory management, arithmetic and instruction exceptions.

12. A method as set forth in claim 1 wherein said first architecture is a CISC architecture and said second architecture is a RISC architecture.

13. A method for executing a second program code while preserving instruction granularity of a first program code from which the second program code is translated when processing interrupts in response to asynchronous events; the first program code being executable on a computer having a first architecture adapted to a first instruction set and the second program code being executable on a computer having a memory and register state and a second architecture adapted to a second instruction set that is reduced relative to the first instruction set; each first code instruction having a corresponding granular sequence of second code instructions wherein said second code instructions include at least two groups of said second code instructions, said two groups including a first group and a second group, said first group including second code instructions other than state update instructions which can be aborted during execution without risking a state error, said second group including all state update instructions, and wherein every second group instruction follows every first group instruction in each granular sequence of second code instructions; said method comprising the steps of:

operating a computer system having a memory and register state and adapted with the second architecture to execute the second program code; and in response to each asynchronous event during second code execution, interrupting execution of a current granular second code instruction sequence in order to perform asynchronous event processing for said each asynchronous event by (i) aborting for a retry said current second code granular instruction sequence when said execution of said current granular second code instruction sequence is interrupted either before every first group instruction in said current granular second code instruction sequence has been executed, or, after all first group instructions in said current granular second code instruction sequence have been executed but before execution of any second group instruction that is in said current granular second code instruction sequence and is subject to a possible exception; and (ii) delaying said asynchronous event processing for said each asynchronous event, in order to execute any unexecuted second code instructions in said current granular second code instruction sequence, when said execution of said current granular second code instruction sequence is interrupted after execution of all state update instructions that are in said current granular second code instruction sequence, that are in said second group, and that are subject to a possible exception.

14. A method as set forth in claim 13 wherein said first group of second code instructions includes a first subgroup of instructions that read and temporarily store inputs and a second subgroup of instructions that operate on said inputs and generate and temporarily store modified results; said second group of second code instructions includes a third subgroup including state update instructions that are subject to exception, and a fourth subgroup including state update instructions that are free of exception, and wherein every fourth subgroup instruction follows every third subgroup instruction in each granular sequence of second code instructions; and wherein said asynchronous event processing is delayed for completion of execution of said current granular second code instruction sequence when said execution of said current granular second code instruction sequence is interrupted after execution of any of said third subgroup instructions that are in said current granular second code instruction sequence.

15. A method as set forth in claim 13 wherein a memory record is made as to whether each second code instruction is a granular boundary instruction for the first code instruction to which said each second code instruction corresponds; when execution of said current granular second code instruction sequence is interrupted, a second code instruction having been last executed is recorded and checked against said memory record to determine whether said second code instruction having been last executed is a boundary instruction, and when said second code instruction having been last executed is a boundary instruction, asynchronous event processing is continued.

16. A method as set forth in claim 15 wherein when said second code instruction having been last executed is not a boundary instruction, a program counter for the second program code is aligned with a next previous boundary instruction in said second program code when said current second code granular instruction sequence is aborted for a retry, and said program counter for the second program code is aligned with a next following boundary instruction in said second program code when said asynchronous event processing for said each asynchronous event is delayed in order to execute any unexecuted second code instructions in said current granular second code instruction sequence.

17. A method as set forth in claim 16 which includes making a forward scan of second code instructions remaining to be executed in said current granular second code instruction sequence to determine whether any of the second code instructions remaining to be executed are subject to a possible exception, backing the program counter for the second program code to the next previous boundary instruction when an instruction subject to exception is found during said forward scan, and when no instruction subject to an exception is found during said forward scan, executing said second code instructions remaining to be executed in said current granular second code instruction sequence, and the continuing asynchronous event processing.

18. A method as set forth in claim 17 wherein a list of each second code instruction having a possible exception is checked during said forward scan when determining whether any of the second code instructions remaining to be executed are subject to a possible exception.

19. A method as set forth in claim 13 wherein said second code instructions include instructions subject to possible memory management, arithmetic and instruction exceptions.

20. A method as set forth in claim 13 wherein said first architecture is a CISC architecture and said second architecture is a RISC architecture.

21. A method for executing a second program code while preserving instruction granularity of a first program code from which the second program code is translated when processing interrupts in response to asynchronous events; the first program code being executable on a computer having a first architecture adapted to a first instruction set and the second program code being executable on a computer having a memory and register state and a second architecture adapted to a second instruction set that is reduced relative to the first instruction set; each first code instruction having a corresponding granular sequence of second code instructions; said second program code having a corresponding memory record as to whether each second code instruction is a granular boundary instruction for the first code instruction to which said each second code instruction corresponds; said method comprising the steps of:

operating a computer system having a memory and register state and adapted with the second architecture to execute the second program code; and in response to each asynchronous event during second code execution, interrupting execution of a current granular second code instruction sequence in order to perform asynchronous event processing for said each asynchronous event by recording a second code instruction having been last executed, and checking said second code instruction having been last executed against said memory record to determine whether said second code instruction having been last executed is a boundary instruction; and (a) when said second code instruction having been last executed is a boundary instruction, continuing asynchronous event processing; and (b) when said second code instruction having been last executed is not a boundary instruction,
  (i) aborting for a retry said current second code granular instruction sequence when said current granular second code instruction sequence includes an unexecuted instruction that is subject to a possible exception, and
  (ii) when said current granular second code instruction sequence does not include an unexecuted instruction that is subject to a possible exception, delaying said asynchronous event processing for said each asynchronous event, in order to execute each unexecuted second code instruction in said current granular second code instruction sequence.

22. A method as set forth in claim 21 wherein when said second code instruction having been last executed is not a boundary instruction, a program counter for the second program code is aligned with a next previous boundary instruction in said second program code when said current second code granular instruction sequence is aborted for a retry, and said program counter for the second program code is aligned with a next following boundary instruction in said second program code when said asynchronous event processing for said each asynchronous event is delayed in order to execute any unexecuted second code instructions in said current granular second code instruction sequence.

23. A method as set forth in claim 22 which includes making a forward scan of second code instructions remaining to be executed in said current granular second code instruction sequence to determine whether any of the second code instructions remaining to be executed are subject to a possible exception, backing the program counter for the second program code to the next previous boundary instruction when an instruction subject to exception is found during said forward scan, and when no instruction subject to an exception is found during said forward scan, executing said second code instructions remaining to be executed in said current granular second code instruction sequence, and the continuing asynchronous event processing.

24. A method as set forth in claim 23 wherein a list of each second code instruction having a possible exception is checked during said forward scan when determining whether any of the second code instructions remaining to be executed are subject to a possible exception.

25. A method as set forth in claim 21 wherein said second code instructions include instructions subject to possible memory management, arithmetic and instruction exceptions.

26. A method as set forth in claim 21 wherein said first architecture is a CISC architecture and said second architecture is a RISC architecture.

27. A method for executing a second program code while preserving instruction granularity of a first program code from which the second program code is translated when processing interrupts in response to asynchronous events; the first program code being executable on a computer having a first architecture adapted to a complex instruction set (CISC) and the second program code being executable on a computer having a memory and register state and a second architecture adapted to a reduced instruction set (RISC) that is reduced relative to the first instruction set; each first code instruction having a corresponding granular sequence of second code instructions; said second program code having a corresponding memory record as to whether each second code instruction is a granular boundary instruction for the first code instruction to which said each second code instruction corresponds; said method comprising the steps of:

operating a computer system having a memory and register state and adapted with the second architecture to execute the second program code; and in response to each asynchronous event during second code execution, interrupting execution of a current granular second code instruction sequence in order to perform asynchronous event processing for said each asynchronous event by recording a second code instruction having been last executed, and checking said second code instruction having been last executed against said memory record to determine whether said second code instruction having been last executed is a boundary instruction; and (a) when said second code instruction having been last executed is a boundary instruction, continuing asynchronous event processing; and (b) when said second code instruction having been last executed is not a boundary instruction, making a forward scan of second code instructions remaining to be executed in said current granular second code instruction sequence to determine whether any of the second code instructions remaining to be executed are subject to a possible exception, and (i) when said forward scan finds a second code instruction remaining to be executed that is subject to a possible exception, aborting said current second code granular instruction sequence for a retry after completion of said asynchronous event processing for each asynchronous event; and (ii) when said current granular second code instruction sequence does not include an unexecuted instruction that is subject to a possible exception, executing each unexecuted second code instruction in said current granular second code instruction sequence, and thereafter continuing said asynchronous event processing for said each asynchronous event.

28. A method as set forth in claim 27 wherein when said second code instruction having been last executed is not a boundary instruction, a program counter for the second program code is aligned with a next previous boundary instruction in said second program code when said current second code granular instruction sequence is aborted for a retry, and said program counter for the second program code is aligned with a next following boundary instruction in said second program code when said asynchronous event processing for said each asynchronous event is delayed in order to execute any unexecuted second code instructions in said current granular second code instruction sequence.

29. A method as set forth in claim 27 wherein a list of each second code instruction having a possible exception is checked during said forward scan, in order to determine whether any of the second code instructions remaining to be executed are subject to a possible exception.

30. A method as set forth in claim 27 wherein said second code instructions include instructions subject to possible memory management, arithmetic and instruction exceptions.

31. A system for executing a second program code containing sequences of instructions that are from a second instruction set for a second architecture, said second instruction set being reduced relative to a first instruction set for a first architecture while preserving instruction granularity of a first program code from which the second program code is translated and which contains instructions from the first instruction set, each first code instruction having a corresponding granular sequence of second code instructions wherein said second code instructions include at least two group of said second code instructions, said two groups including a first group and a second group, said first group including second code instructions other than state update instructions which can be aborted during execution without risking a state error, said second group including all state update instructions, and wherein every second group instruction follows every first group instruction in each granular sequence of second code instructions; said system comprising:

a computer for executing the second code, said computer having a second architecture and having a processor and a memory coupled to said processor, and means responsive to an asynchronous event during second code execution for interrupting execution of a current granular second code instruction sequence in order to perform asynchronous event processing for said asynchronous event, said means responsive to an asynchronous event including:

(i) means for aborting for a retry said current second code granular instruction sequence when said execution of said current granular second code instruction sequence is interrupted either before every first group instruction in said current granular second code instruction sequence has been executed, or, after all first group instructions in said current granular second code instruction sequence have been executed but before execution of any second group instruction that is in said current granular second code instruction sequence and is subject to a possible exception; and         (ii) means for delaying said asynchronous event processing for said each asynchronous event, in order to execute any unexecuted second code instructions in said current granular second code instruction sequence, when said execution of said current granular second code instruction sequence is interrupted after execution of all state update instructions that are in said current granular second code instruction sequence, that are in said second group, and that are subject to a possible exception.

32. A method as set forth in claim 31 wherein said first group of second code instructions includes a first subgroup of instructions that read and temporarily store inputs and a second subgroup of instructions that operate on said inputs and generate and temporarily store modified results; said second group of second code instructions includes a third subgroup including state update instructions that are subject to exception, and a fourth subgroup including state update instructions that are free of exception, and wherein every fourth subgroup instruction follows every third subgroup instruction in each granular sequence of second code instructions; and wherein said means for delaying includes means for delaying said asynchronous event processing for completion of execution of said current granular second code instruction sequence when said execution of said current granular second code instruction sequence is interrupted after execution of any of said third subgroup instructions that are in said current granular second code instruction sequence.

33. A system as set forth in claim 32 wherein said memory holds a memory record indicating whether each second code instruction is a granular boundary instruction for the first code instruction to which said each second code instruction corresponds; and said means responsive to an asynchronous event includes means, responsive when said execution of said current granular second code instruction sequence is interrupted, for recording a second code instruction having been last executed and checking said second code instruction having been last executed against said memory record to determine whether said second code instruction having been last executed is a boundary instruction, and when said second code instruction having been last executed is a boundary instruction, for continuing asynchronous event processing.

34. A system as set forth in claim 33, wherein said means responsive to an asynchronous event includes means responsive when said second code instruction having been last executed is not a boundary instruction for aligning a program counter for the second program code with a next previous boundary instruction in said second program code when said execution of said current second code granular instruction sequence is aborted for a retry, and for aligning said program counter for the second program code with a next following boundary instruction in said second program code when said asynchronous event processing for said asynchronous event is delayed in order to execute any unexecuted second code instructions in said current granular second code instruction sequence.

35. A system as set forth in claim 34, wherein said means responsive to an asynchronous event includes means for making a forward scan of second code instructions remaining to be executed in said current granular second code instruction sequence to determine whether any of the second code instructions remaining to be executed are subject to a possible exception, backing the program counter for the second program code to the next previous boundary instruction when an instruction subject to exception is found during said forward scan, and when no instruction subject to an exception is found during said forward scan, for executing said second code instructions remaining to be executed in said current granular second code instruction sequence, and for then continuing asynchronous event processing.

36. A system as set forth in claim 35 wherein said means for making a forward scan includes means for checking a list of each second code instruction having a possible exception when determining whether any of the second code instructions remaining to be executed are subject to a possible exception.

37. A method as set forth in claim 31 wherein said second code instructions include instructions subject to possible memory management, arithmetic and instruction exceptions.

38. A method as set forth in claim 31 wherein said first architecture is a CISC architecture and said second architecture is a RISC architecture.

39. A system for executing a second program code containing sequences of instructions that are from a second instruction set for a second architecture, said second instruction set being reduced relative to a first instruction set for a first architecture while preserving instruction granularity of a first program code from which the second program code is translated and which contains instructions from the first instruction set, each first code instruction having a corresponding granular sequence of second code instructions; said system comprising:

a computer for executing the second code, said computer having a second architecture and having a processor and a memory coupled to said processor, and means responsive to an asynchronous event during second code execution for interrupting execution of a current granular second code instruction sequence in order to perform asynchronous event processing for said asynchronous event, said memory holding a memory record indicating whether each second code instruction is a granular boundary instruction for the first code instruction to which said each second code instruction corresponds; and said means responsive to an synchronous event including:

means for recording a second code instruction having been last executed, and checking said second code instruction having been last executed against said memory record to determine whether said second code instruction having been last executed is a boundary instruction; and (a) means responsive when said second code instruction having been last executed is a boundary instruction for continuing asynchronous event processing; and (b) means responsive when said second code instruction having been last executed is not a boundary instruction, for
 (i) aborting for a retry said current second code granular instruction sequence when said current granular second code instruction sequence includes an unexecuted instruction that is subject to a possible exception, and
 (ii) when said current granular second code instruction sequence does not include an unexecuted instruction that is subject to a possible exception, delaying said asynchronous event processing for said each asynchronous event, in order to execute each unexecuted second code instruction in said current granular second code instruction sequence.

40. A system as set forth in claim 39 wherein said means responsive to an asynchronous event includes means responsive when execution of said current granular second code instruction sequence is interrupted, for recording a second code instruction having been last executed and checking said second code instruction having been last executed against said memory record to determine whether said second code instruction having been last executed is a boundary instruction, and when said second code instruction having been last executed is a boundary instruction, for continuing asynchronous event processing.

41. A system as set forth in claim 40, wherein said means responsive to an asynchronous event includes means responsive when said second code instruction having been last executed is not a boundary instruction for aligning a program counter for the second program code with a next previous boundary instruction in said second program code when said current second code granular instruction sequence is aborted for a retry, and for aligning said program counter for the second program code with a next following boundary instruction in said second program code when said asynchronous event processing for said asynchronous event is delayed in order to execute any unexecuted second code instructions in said current granular second code instruction sequence.

42. A system as set forth in claim 41, wherein said means responsive to an asynchronous event includes means for making a forward scan of second code instructions remaining to be executed in said current granular second code instruction sequence to determine whether any of the second code instructions remaining to be executed are subject to a possible exception, backing the program counter for the second program code to the next previous boundary instruction when an instruction subject to exception is found during said forward scan, and when no instruction subject to an exception is found during said forward scan, for executing said second code instructions remaining to be executed in said current granular second code instruction sequence, and for then continuing asynchronous event processing.

43. A system as set forth in claim 42, wherein said means for making a forward scan includes means for checking a list of each second code instruction having a possible exception when determining whether any of the second code instructions remaining to be executed are subject to a possible exception.

44. A method as set forth in claim 39 wherein said second code instructions include instructions subject to possible memory management, arithmetic and instruction exceptions.

45. A method as set forth in claim 39 wherein said first architecture is a CISC architecture and said second architecture is a RISC architecture.

* * * * *